(12) United States Patent
Lee et al.

(10) Patent No.: US 12,143,682 B2
(45) Date of Patent: Nov. 12, 2024

(54) DISPLAY DEVICE

(71) Applicant: LG ELECTRONICS INC., Seoul (KR)

(72) Inventors: Eunjung Lee, Seoul (KR); Soonhyung Hwang, Seoul (KR); Janghee Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/418,632

(22) PCT Filed: May 20, 2019

(86) PCT No.: PCT/KR2019/005983
§ 371 (c)(1),
(2) Date: Jun. 25, 2021

(87) PCT Pub. No.: WO2020/235699
PCT Pub. Date: Nov. 26, 2020

(65) Prior Publication Data
US 2022/0124415 A1  Apr. 21, 2022

(51) Int. Cl.
*H04N 21/485* (2011.01)
*H04N 21/4363* (2011.01)
*H04N 21/482* (2011.01)
*H04N 21/488* (2011.01)

(52) U.S. Cl.
CPC ... *H04N 21/4852* (2013.01); *H04N 21/43637* (2013.01); *H04N 21/4821* (2013.01); *H04N 21/4882* (2013.01)

(58) Field of Classification Search
CPC ......... H04N 21/4852; H04N 21/43637; H04N 21/4821; H04N 21/4882
See application file for complete search history.

(56) References Cited

U.S. PATENT DOCUMENTS

| | | | |
|---|---|---|---|
| 6,188,439 | B1 | 2/2001 | Kim |
| 2004/0184619 | A1* | 9/2004 | Inagaki ............ H04R 5/04 340/310.11 |
| 2005/0036069 | A1 | 2/2005 | Lee et al. |
| 2009/0290065 | A1 | 11/2009 | Asayama et al. |
| 2010/0169925 | A1 | 7/2010 | Takegoshi |

(Continued)

FOREIGN PATENT DOCUMENTS

| | | |
|---|---|---|
| KR | 20100011009 | 2/2010 |
| KR | 1020120041089 | 4/2012 |

OTHER PUBLICATIONS

PCT International Application No. PCT/KR2019/005983, International Search Report dated Feb. 19, 2020, 4 pages.

(Continued)

*Primary Examiner* — Kunal Langhnoja
(74) *Attorney, Agent, or Firm* — LEE, HONG, DEGERMAN, KANG & WAIMEY

(57) ABSTRACT

Disclosed herein is a display device for more appropriately providing a surround effect. The display device may include a display configured to display a video, an audio output interface configured to output sound, a wireless communication interface configured to establish Bluetooth connection with at least one external speaker, and a controller configured to control an audio mode to a surround mode or a non-surround mode according to the video.

8 Claims, 14 Drawing Sheets

(56) References Cited

U.S. PATENT DOCUMENTS

| | | | |
|---|---|---|---|
| 2015/0058877 A1* | 2/2015 | Lakkundi | H04N 21/439 |
| | | | 725/19 |
| 2015/0169280 A1 | 6/2015 | Suzuki et al. | |
| 2015/0334338 A1* | 11/2015 | Lim | H04N 21/43637 |
| | | | 348/515 |
| 2017/0188151 A1* | 6/2017 | Veeramani | H04R 3/12 |
| 2017/0318255 A1* | 11/2017 | Ishihara | H05K 999/99 |

OTHER PUBLICATIONS

European Patent Office Application Serial No. 19929248.3, Extended European Search Report dated Nov. 28, 2022, 8 pages.

* cited by examiner

FIG. 6
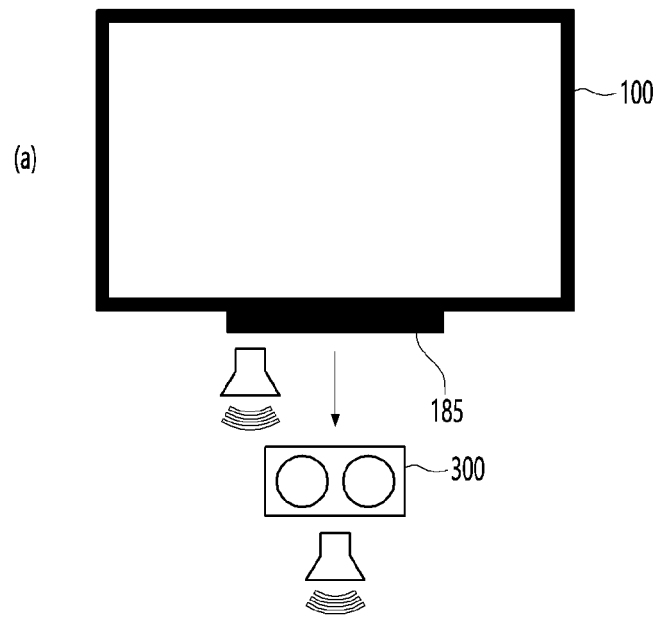
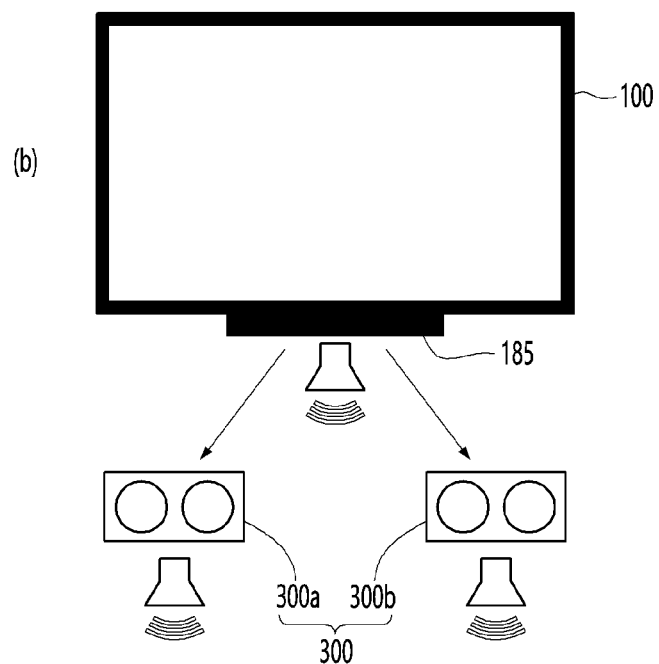

DISPLAY DEVICE

CROSS-REFERENCE TO RELATED APPLICATIONS

This application is the National Stage filing under 35 U.S.C. 371 of International Application No. PCT/KR2019/005983, filed on May 20, 2019, the contents of which are all incorporated by reference herein in their entirety.

TECHNICAL FIELD

The present disclosure relates to a display device and, more particularly, to a display device connected to a plurality of speakers.

BACKGROUND ART

Recently, with development of not only video technology but also audio technology, general users who use TVs also have growing needs to listen to audio with good quality.

Accordingly, a user may connect multiple speakers to a TV and the TV may provide stereophonic sound to the user through an internal speaker and the multiple speakers connected to the TV. That is, the TV may not only output sound using one channel but also output different sounds using two or more channels, providing the user with an effect that gives the user a sense of realism as if they are there. Such an effect may be referred to as a surround effect.

On the other hand, it cannot be said that it is unconditionally good to provide the user with the surround effect. For example, the user may experience richer surround effects when watching movies and concert videos. However, when watching news, since the user wants to hear a clear voice, the user may be disturbed by the surround effect. Accordingly, there is a need for a method of providing a surround effect only when a user wants the surround effect.

Invention

Technical Problem

The present disclosure is to provide a display device for outputting sound in a surround mode only when a user wants a surround effect.

The present disclosure is to provide a display device for outputting sound according to settings preferred by a user when outputting sound in a surround mode.

Technical Solution

A display device according to an embodiment of this present application comprises a display configured to display a video, an audio output interface configured to output sound, a wireless communication interface configured to establish Bluetooth connection with at least one external speaker, and a controller configured to control an audio mode to a surround mode or a non-surround mode according to the video.

The controller is configured to perform control to output 2-channel sound through the audio output interface and the external speaker in the surround mode, and perform control to output 1-channel sound through at least one of the audio output interface or the external speaker in the non-surround mode.

The controller is configured to acquire a genre of the video, and control the audio mode to the surround mode when the acquired genre corresponds to a genre set to apply a surround function.

The controller is configured to acquire the genre of the video from an electronic program guide (EPG).

The controller is configured to receive a genre setting command for setting at least one genre as an object, to which a surround function is applied.

The controller is configured to acquire a channel number of the video, and control the audio mode to the surround mode when the acquired channel number corresponds to a channel number set to apply a surround function.

The controller is configured to receive a channel setting command for setting at least one channel number as an object, to which the surround function is applied.

The controller is configured to determine whether the video corresponds to a video set to apply a surround function when a display time of the video exceeds a set time and to control the audio mode to the surround mode upon determining that the video corresponds to the video set to apply the surround function.

The controller is configured to control the display to display a message for determining whether to perform the surround mode, when the video corresponds to a video set to apply a surround function.

The controller is configured to control the audio mode to the surround mode when a command for performing the surround mode is received, and control the audio mode to the non-surround mode when the command for performing the surround mode is not received.

The controller is configured to control the audio mode to the surround mode when the video corresponds to a video set to apply a surround function and to control the audio mode to the non-surround mode when the video does not correspond to a video set to apply the surround function.

The controller is configured to determine whether connection with the external speaker is established when the audio mode is switched from the non-surround mode to the surround mode, and control the wireless communication interface to establish Bluetooth connection with the external speaker when connection with the external speaker is not established.

The display device further comprising a storage configured to store surround environment information used in the surround mode, the controller is configured to perform control to output sound according to the surround environment information when establishing Bluetooth connection with the external speaker.

The audio output interface and the external speaker output different sounds in the surround mode, and the non-surround mode includes a TV speaker mode in which only the audio output interface outputs sound, a Bluetooth speaker mode in which only the external speaker outputs sound, and a speaker extension mode in which the audio output interface and the external speaker output the same sound.

The controller is configured to control the audio mode to any one of the surround mode, the TV speaker mode, the Bluetooth speaker mode and the speaker extension mode according to the video.

Effect of the Invention

According to embodiments of the present disclosure, by changing an audio mode according to a video, it is possible to provide a rich sound effect through a surround function and to minimize the case where the user's viewing of the video is disturbed due to the surround function.

In addition, by determining whether to apply a surround function according to a video genre, it is possible to improve accuracy of distinguishing between a video requiring a surround effect and a video which does not require a surround effect.

In addition, upon determining whether to apply a surround function according to a channel number, it is possible to determine whether to apply a surround effect according to the characteristics of a channel (movie channel, news channel, etc.).

In addition, by controlling a speaker according to user's preferred surround environment information at the time of operation in a surround mode, it is possible to minimize inconvenience of the user changing a preferred environment whenever the surround mode is performed.

DESCRIPTION OF DRAWINGS

FIG. 6 is a view showing a state in which a display device according to an embodiment of the present disclosure operates in a surround mode.

BEST MODE

Hereinafter, embodiments relating to the present invention will be described in detail with reference to the accompanying drawings. The suffixes "unit" for components used in the description below are assigned or mixed in consideration of easiness in writing the specification and do not have distinctive meanings or roles by themselves.

Terms including ordinal numbers such as first and second may be used to describe various elements, but the elements are not limited by the terms. The terms are only used for the purpose of distinguishing one component from another component.

Figure 1:
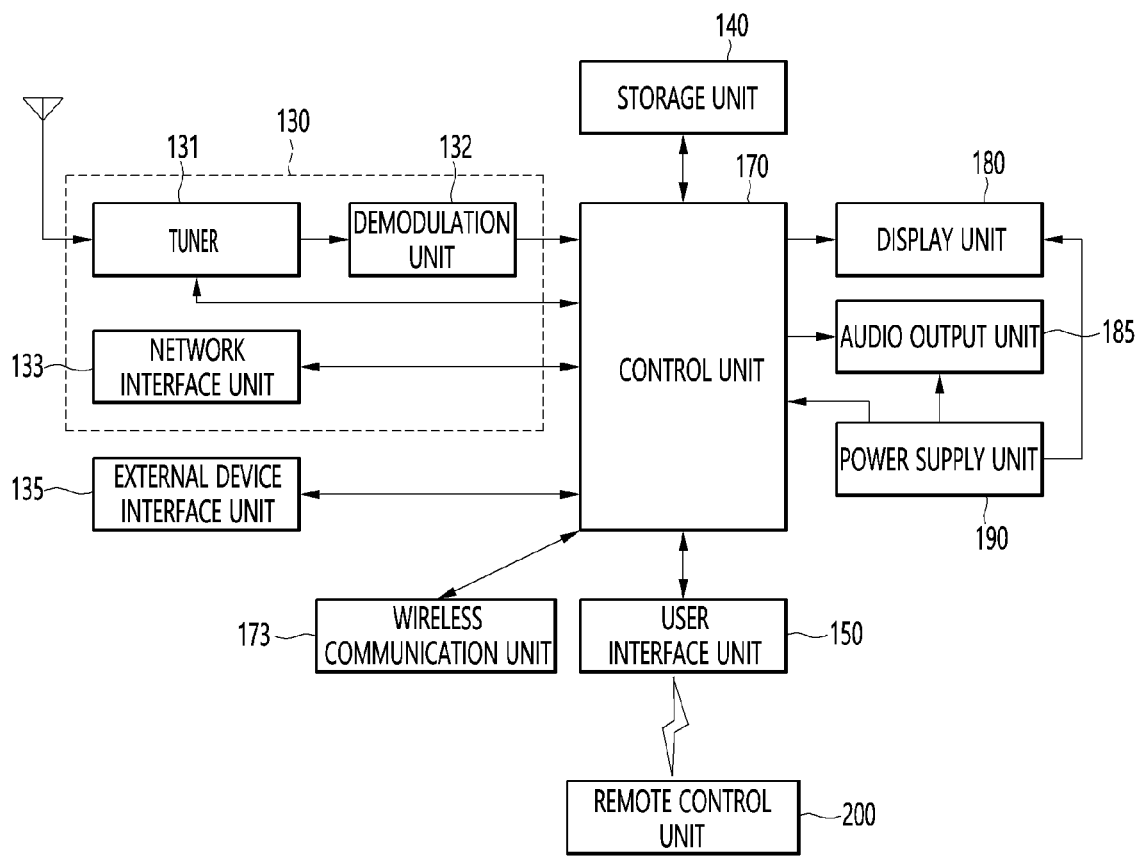
FIG. 1 is a block diagram illustrating a configuration of a display device according to an embodiment of the present invention.

FIG. 1 is a block diagram illustrating a configuration of a display device according to an embodiment of the present invention.

Referring to FIG. 1, a display device 100 can include a broadcast reception unit 130, an external device interface unit 135, a storage unit 140, a user input interface unit 150, a controller 170, a wireless communication unit 173, a display unit 180, an audio output unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The network interface unit 133 can provide an interface for connecting the display device 100 to a wired/wireless network including internet network. The network interface unit 133 can transmit or receive data to or from another user or another electronic device through an accessed network or another network linked to the accessed network.

The network interface unit 133 can access a predetermined webpage through an accessed network or another network linked to the accessed network. That is, it can transmit or receive data to or from a corresponding server by accessing a predetermined webpage through network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an internet or content provider or a network operator.

The network interface unit 133 can select and receive a desired application among applications open to the air, through network.

The external device interface unit 135 can receive an application or an application list in an adjacent external device and deliver it to the controller 170 or the storage unit 140.

The external device interface 135 can provide a connection path between the display device 100 and an external device. The external device interface 135 can receive at least one of image and audio outputted from an external device that is wirelessly or wiredly connected to the display device 100 and deliver it to the control unit. The external device interface unit 135 can include a plurality of external input terminals. The plurality of external input terminals can include an RGB terminal, at least one High Definition Multimedia Interface (HDMI) terminal, and a component terminal.

An image signal of an external device inputted through the external device interface unit 135 can be outputted through the display unit 180. A sound signal of an external device inputted through the external device interface unit 135 can be outputted through the audio output unit 185.

An external device connectable to the external device interface unit 130 can be one of a set-top box, a Blu-ray player, a DVD player, a game console, a sound bar, a smartphone, a PC, a USB Memory, and a home theater system but this is just exemplary.

Additionally, some content data stored in the display device 100 can be transmitted to a user or an electronic device, which is selected from other users or other electronic devices pre-registered in the display device 100.

The storage unit 140 can store signal-processed image, voice, or data signals stored by a program in order for each signal processing and control in the controller 170.

Additionally, the storage unit 140 can perform a function for temporarily store image, voice, or data signals outputted from the external device interface unit 135 or the network interface unit 133 and can store information on a predetermined image through a channel memory function.

The storage unit 140 can store an application or an application list inputted from the external device interface unit 135 or the network interface unit 133.

The display device 100 can play content files (for example, video files, still image files, music files, document files, application files, and so on) stored in the storage unit 140 and provide them to a user.

The user input interface unit 150 can deliver signals inputted from a user to the controller 170 or deliver signals from the controller 170 to a user. For example, the user input interface unit 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface unit 150 can deliver, to the controller 170, control signals inputted from local keys (not shown) such as a power key, a channel key, a volume key, and a setting key.

Image signals that are image-processed in the controller 170 can be inputted to the display unit 180 and displayed as an image corresponding to corresponding image signals. Additionally, image signals that are image-processed in the controller 170 can be inputted to an external output device through the external device interface unit 135.

Voice signals processed in the controller 170 can be outputted to the audio output unit 185. Additionally, voice signals processed in the controller 170 can be inputted to an external output device through the external device interface unit 135.

Besides that, the control module 170 can control overall operations in the display device 100.

Additionally, the controller 170 can control the display device 100 by a user command or internal program inputted through the user input interface unit 150 and download a desired application or application list into the display device 100 in access to network.

The controller 170 can output channel information selected by a user together with processed image or voice signals through the display unit 180 or the audio output unit 185.

Additionally, according to an external device image playback command received through the user input interface unit 150, the controller 170 can output image signals or voice signals of an external device such as a camera or a camcorder, which are inputted through the external device interface unit 135, through the display unit 180 or the audio output unit 185.

Moreover, the controller 170 can control the display unit 180 to display images and control broadcast images inputted through the tuner 131, external input images inputted through the external device interface unit 135, images inputted through the network interface unit, or images stored in the storage unit 140 to be displayed on the display unit 180. In this case, an image displayed on the display unit 180 can be a still image or video and also can be a 2D image or a 3D image.

Additionally, the controller 170 can play content stored in the display device 100, received broadcast content, and external input content inputted from the outside, and the content can be in various formats such as broadcast images, external input images, audio files, still images, accessed web screens, and document files.

Moreover, the wireless communication unit 173 can perform a wired or wireless communication with an external electronic device. The wireless communication unit 173 can perform short-range communication with an external device. For this, the wireless communication unit 173 can support short-range communication by using at least one of Bluetoothm, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

The wireless communication unit 173 may be a wireless transceiver. In more detail, the wireless communication unit 173 may typically include one or more modules which permit communications such as wireless communications between a display device 100 (e.g., or mobile terminal) and a wireless communication system, communications between the mobile terminal 100 and another mobile terminal, or communications between the display device 100 and an external server. Further, the wireless communication unit 173 may typically include one or more modules which connect the display device 100 to one or more networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication unit 173. Accordingly, a user of the wearable device can use the data processed in the display device 100 through the wearable device.

The display unit 180 can convert image signals, data signals, or OSD signals, which are processed in the controller 170, or images signals or data signals, which are received in the external device interface unit 135, into R, G, and B signals to generate driving signals.

Furthermore, the display device 100 shown in FIG. 1 is just one embodiment of the present invention and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present invention and its specific operation or device does not limit the scope of the present invention.

According to another embodiment of the present invention, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present invention described below can be performed by one of the display device described with reference to FIG. 1, an image processing device such as the separated set-top box, and a content playback device including the display unit 180 and the audio output unit 185.

The audio output unit 185 receives the audio processed signal from the controller 170 and outputs the sound. The audio output unit 185 may be implemented as a receiver, a speaker, a buzzer, or the like.

Figure 2:
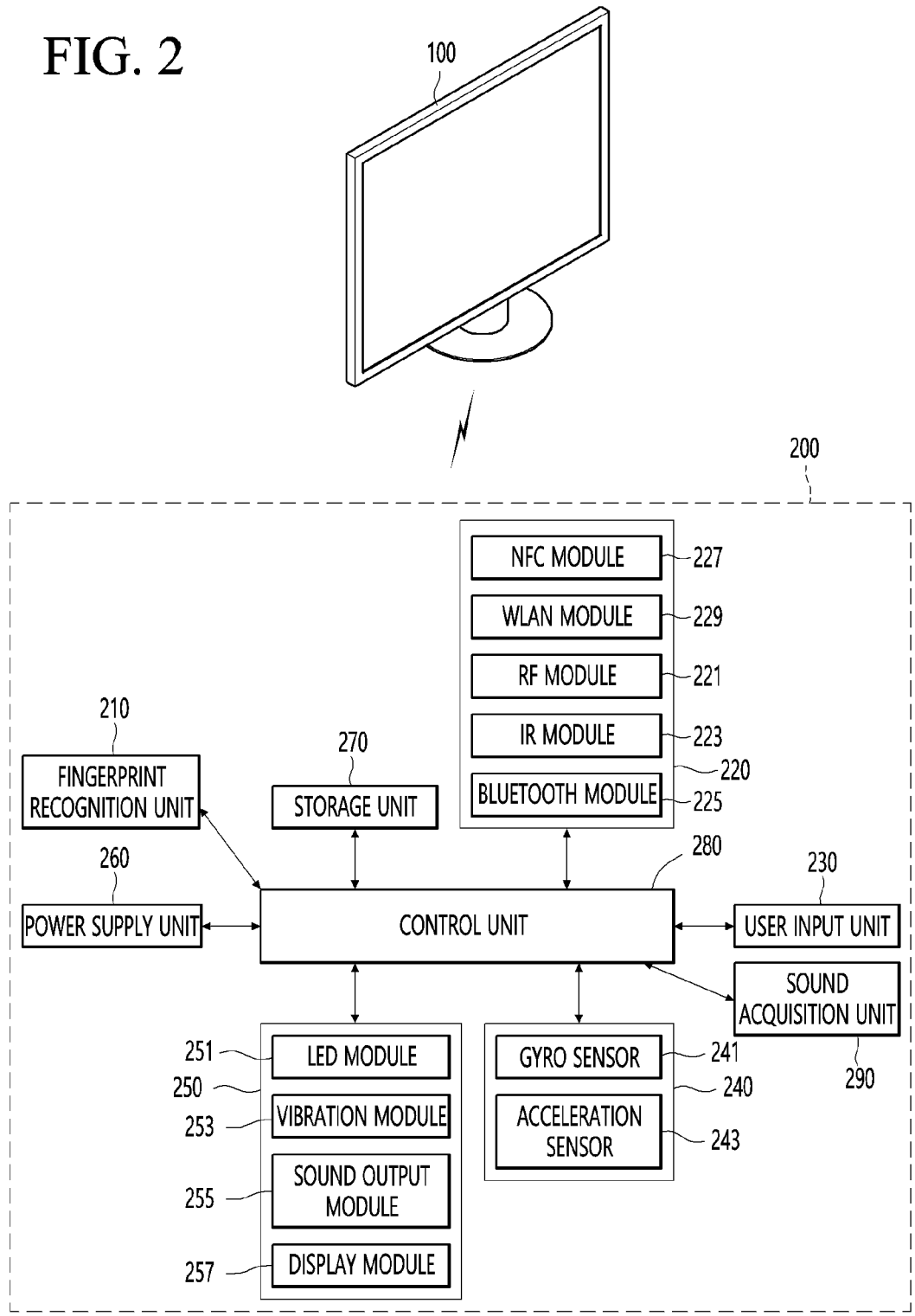
FIG. 2 is a block diagram illustrating a remote control device according to an embodiment of the present invention.
Figure 3:
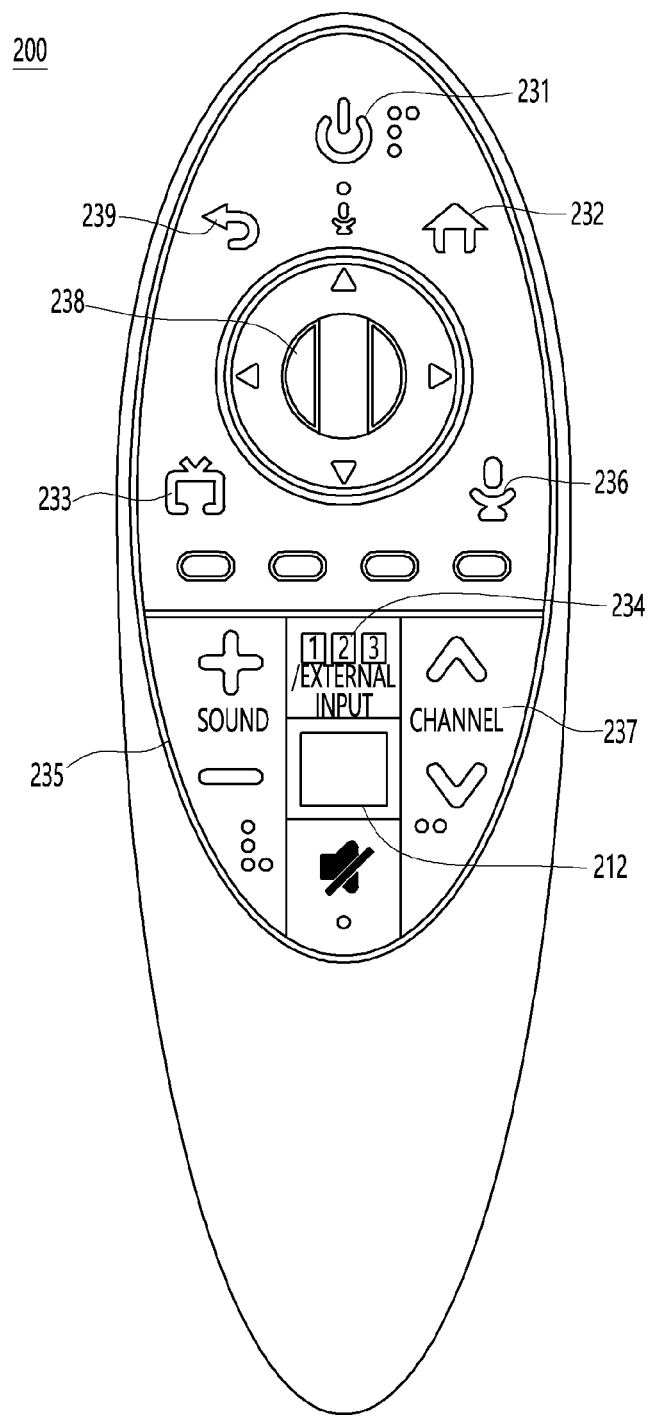
FIG. 3 is a view illustrating an actual configuration of a remote control device according to an embodiment of the present invention.

Then, referring to FIGS. 2 and 3, a remote control device is described according to an embodiment of the present invention.

FIG. 2 is a block diagram illustrating a remote control device according to an embodiment of the present invention and FIG. 3 is a view illustrating an actual configuration of a remote control device according to an embodiment of the present invention.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a voice acquisition unit 290.

Referring to FIG. 2, the wireless communication unit 225 transmits/receives signals to/from an arbitrary any one of display devices according to the above-mentioned embodiments of the present invention.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user"s fingerprint. According to an embodiment of the present invention, the fingerprint recognition button 212 can perform a push operation and receive a push operation and a fingerprint recognition operation. The power button 231 can be button for turning on/off the power of the display device 100. The power button 232 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume outputted from the display device 100. The voice recognition button 236 can be a button for receiving user"s voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present invention.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals corresponding to a manipulation of the user input unit 235 or corresponding to signals transmitted from the display device 100. A user can recognize whether the user input unit 235 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 235 is manipulated or signals are transmitted/received to/from the display device 100 through the wireless communication unit 225.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it.

The control unit 280 controls general matters relating to a control of the remote control device 200. The control unit 280 can transmit a signal corresponding to a predetermined key manipulation of the user input unit 235 or a signal corresponding to a movement of the remote control device 200 sensed by the sensor unit 240 to the display device 100 through the wireless communication unit 225.

Additionally, the voice acquisition unit 290 of the remote control device 200 can obtain voice.

The voice acquisition unit 290 can include at least one microphone 291 and obtain voice through the microphone 291.

Figure 4:
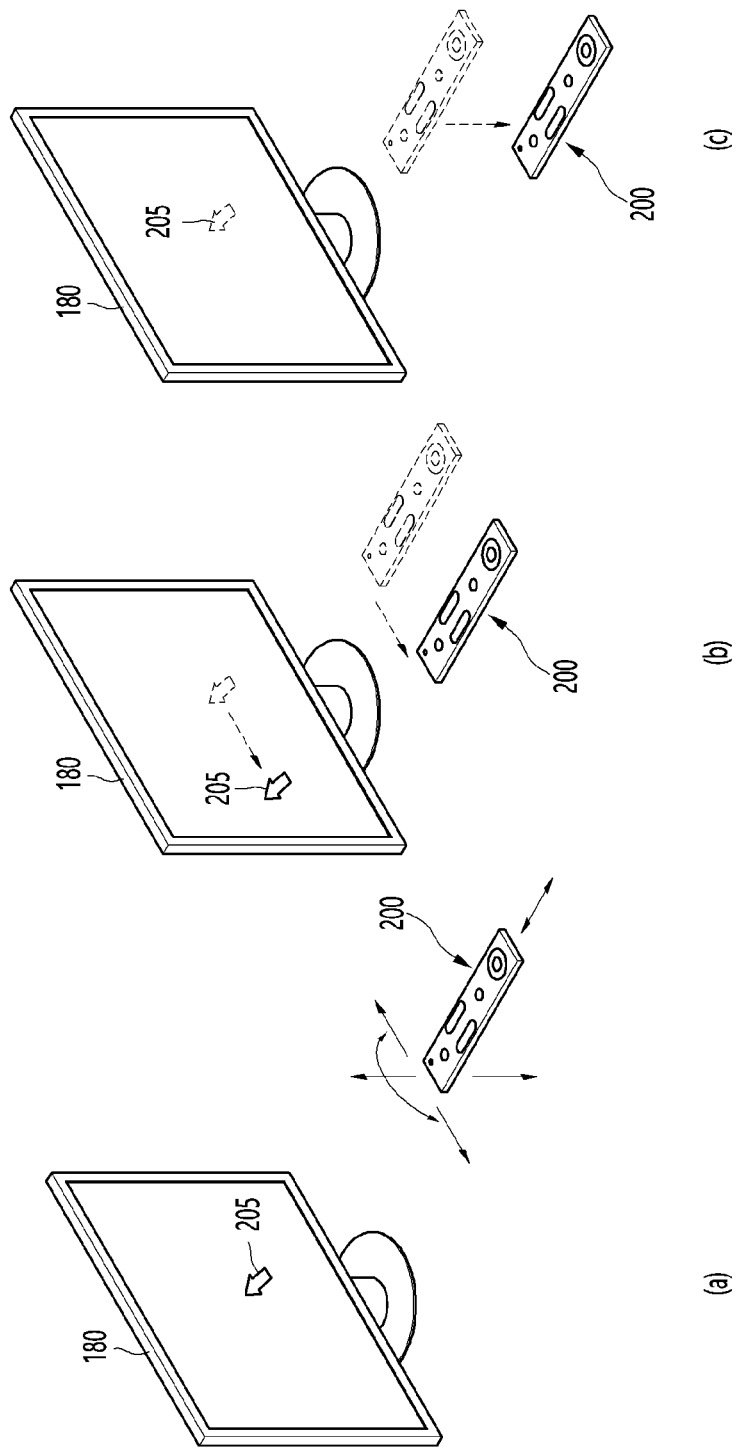
FIG. 4 is a view of utilizing a remote control device according to an embodiment of the present invention.

Then, FIG. 4 is described.

FIG. 4 is a view of utilizing a remote control device according to an embodiment of the present invention.

FIG. 4A illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display unit 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display unit 180. Thus, a selection area in the display unit 180 corresponding to the pointer 205 can be zoomed in and displayed largely.

On the other hand, if a user moves the remote control device 200 close to the display unit 180, a selection area in the display unit 180 corresponding to the pointer 205 can be zoomed out and displayed reduced.

On the other hand, if the remote control device 200 is away from the display unit 180, a selection area can be zoomed out and if the remote control device 200 is close to the display unit 180, a selection area can be zoomed in.

Additionally, if a specific button in the remote control device 200 is pressed, the recognition of a vertical or horizontal movement can be excluded. That is, if the remote control device 200 is moved away from or close to the display unit 180, the up, down, left, or right movement can not be recognized and only the back and fourth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

The display device 100 may be connected to at least one external speaker.

The external speaker may be connected to the display device 100 wirelessly or by wire, and may mean a speaker selectively connectable to the display device 100. For example, the external speaker may include an audio output function such as a smartphone, a tablet PC, a portable speaker and a sound bar and may include all devices connectable to the display device 100 through Bluetooth.

The display device 100 may be connected to at least one external speaker wirelessly or by wire. For example, the display device 100 may be connected to the at least one external speaker using the wireless communication unit 173 through Bluetooth.

The controller 170 may perform control to output sound corresponding to a video output by the display unit 180 through at least one of the audio output unit 185 or an external speaker connected through Bluetooth.

Meanwhile, the controller 170 may determine the type of a speaker for outputting sound and the type of sound output from the speaker, according to an audio mode.

The audio mode may mean a method of outputting sound by the display device 100.

The audio mode may include a surround mode and a non-surround mode.

The controller 170 may perform control to output 2-channel sound through the audio output unit 185 and the external speaker in the surround mode and to output 1-channel sound through at least one of the audio output unit 185 or the external speaker in the non-surround mode.

Figure 5:
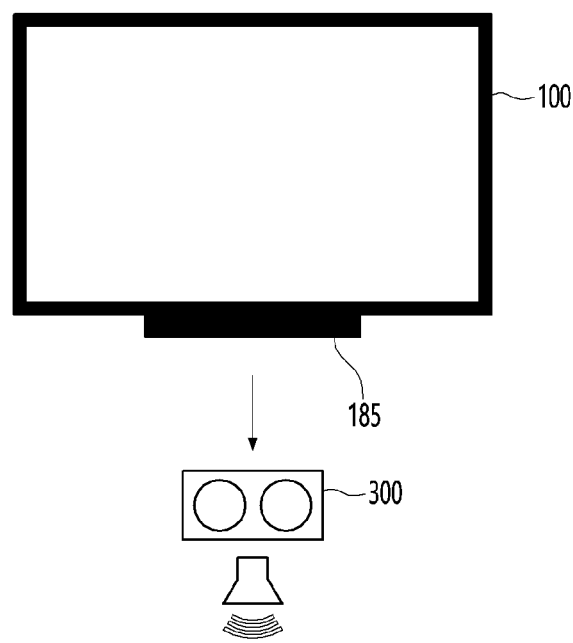
FIG. 5 is a view showing a state in which a display device according to an embodiment of the present disclosure operates in a non-surround mode.

FIG. 5 is a view showing a state in which a display device according to an embodiment of the present disclosure operates in a non-surround mode, and FIG. 6 is a view showing a state in which a display device according to an embodiment of the present disclosure operates in a surround mode.

Referring to FIG. 5, the controller 170 may perform control to transmit an audio signal such that the external speaker 300 connected through Bluetooth outputs sound and the audio output unit 185 does not output sound, in the non-surround mode. The audio output unit 185 may mean the internal speaker of the display device 100.

The controller 170 may perform control such that only the external speaker 300 outputs sound, in the non-surround mode. As shown in FIG. 5, an audio mode in which only the external speaker 300 outputs sound may be referred to as a Bluetooth speaker mode.

Meanwhile, the Bluetooth speaker mode shown in FIG. 5 is an example of the non-surround mode, and the non-surround mode may further include a TV speaker mode and a speaker extension mode in addition to the Bluetooth speaker mode.

Specifically, the non-surround mode may include a TV speaker mode, a Bluetooth speaker mode and a speaker extension mode. The TV speaker mode refers to a mode in which only the audio output unit 185 outputs sound, the Bluetooth speaker mode refers to a mode in which only the external speaker 300 outputs sound, and the speaker extension mode refers to a mode in which the audio output unit 185 and the external speaker 300 output the same sound.

In the non-surround mode, the controller 170 may control the audio mode to be the Bluetooth speaker mode when the at least one external speaker 300 is connected and control the audio mode to be the TV speaker mode when the external speaker 300 is not connected. According to setting information, in the non-surround mode, the controller 170 may control the audio mode to be the TV speaker mode even when the external speaker 300 is connected.

Meanwhile, although only one external speaker 300 connected through Bluetooth is shown in FIG. 5, this is only an example for convenience of description and the display device 100 may be connected with two or more external speakers.

Referring to FIG. 6, the controller 170 may output sound through the external speaker 300 connected through Bluetooth and the audio output unit 185 at the time of operation in the surround mode. In particular, the controller 170 may perform control such that the external speaker 300 and the audio output unit 185 output different sounds in the surround mode.

FIG. 6(*a*) shows the case where only one external speaker 300 is connected to the display device 100, and FIG. 6(*b*) shows the case where two speakers 300*a* and 300*b* are connected to the display device 100.

Similarly, although one or two external speakers 300 is connected through Bluetooth in FIG. 6, this is only an example for convenience of description and two or more external speakers may be connected to the display device 100.

Meanwhile, as shown in FIG. 6(*b*), when the plurality of speakers 300*a* and 300*b* is connected to the display device 100, the plurality of speakers 300*a* and 300*b* and the audio output unit 185 may output the same sound or different sounds.

The surround mode may refer to a mode for giving a user a sense of realism as if they are there, by enabling the external speaker 300 and the audio output unit 185 to output different sounds through sound image fixing and sound mix.

Figure 7:
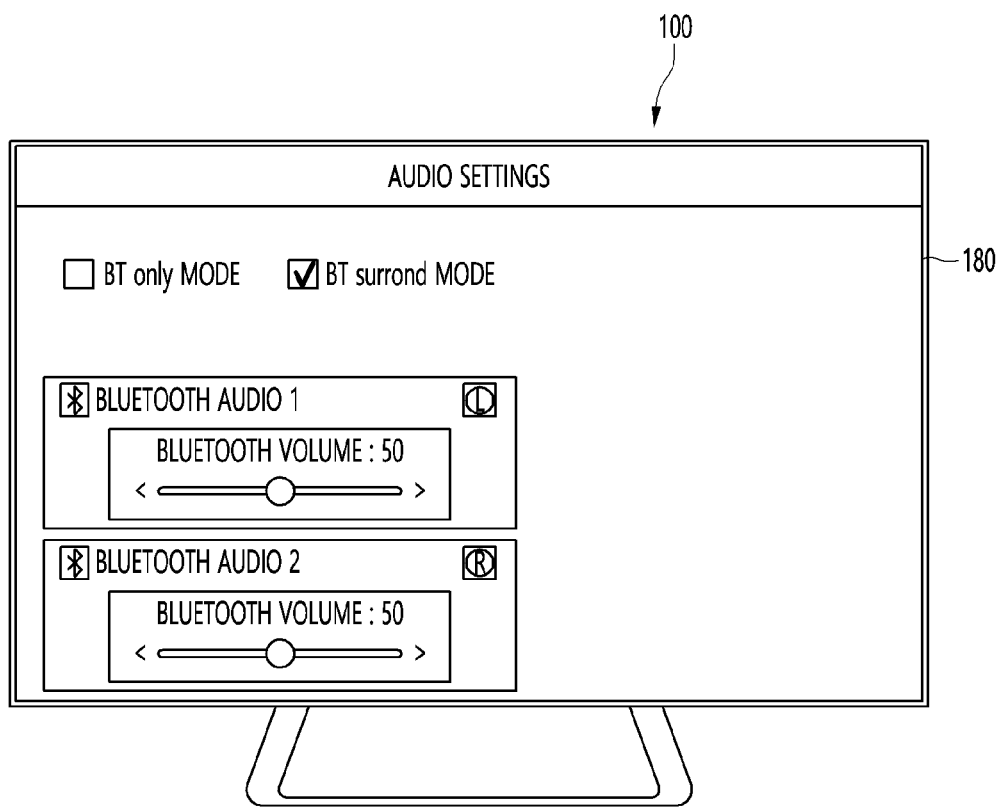
FIG. 7 is a view showing a method of selecting an audio mode according to a first embodiment of the present disclosure.
Figure 8:
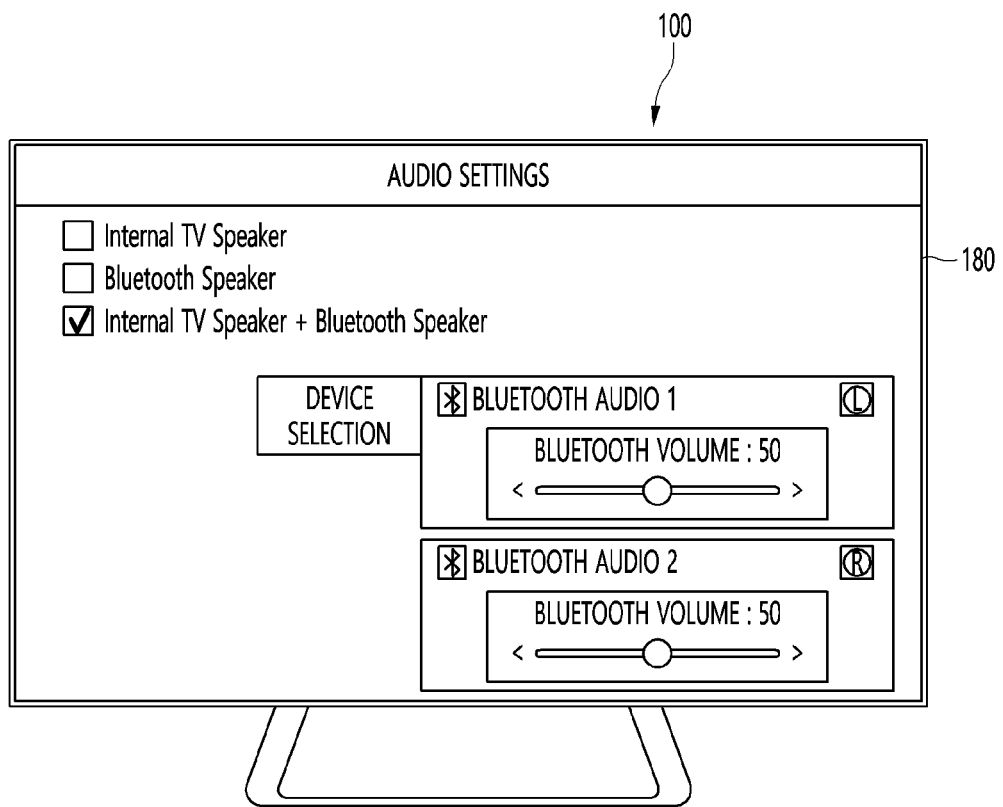
FIG. 8 is a view showing a method of selecting an audio mode according to a second embodiment of the present disclosure.

FIG. 7 is a view showing a method of selecting an audio mode according to a first embodiment of the present disclosure, and FIG. 8 is a view showing a method of selecting an audio mode according to a second embodiment of the present disclosure.

The controller 170 may control the display unit 180 to display an audio setting screen for setting audio related information.

According to the first embodiment, as shown in FIG. 7, the audio setting screen may include at least one of a first icon for not performing a surround function or a second icon for performing a surround function. For example, the first icon may be "BT only MODE" and the second icon may be "BT surround MODE". However, this is only an example for convenience of description and is not limited thereto.

The controller 170 may perform control such that only the external speaker 300 outputs sound, when a command for selecting the icon for not performing the surround function is received, and perform control such that the external speaker 300 and the audio output unit 185 simultaneously output sounds, when a command for selecting the icon for performing the surround function is received. Meanwhile, when the icon for performing the surround function is selected, the controller 170 may not control the audio mode to be always the surround mode but may control the audio mode to be selectively the surround mode according to the video. A detailed description thereof will be described below with reference to FIG. 9.

The audio setting screen may further include a Bluetooth setting icon for setting information on the external speaker 300. The Bluetooth setting icon may include an icon for setting the volume or the speaker position of each external speaker 300 connected to the display device 100. An icon for setting the speaker position may include icons for selecting the left L and the right R as shown in FIG. 7 and may further include icons for selecting left surround and right surround in some embodiments.

According to the second embodiment, as shown in FIG. 8, the audio setting screen may include a first icon for controlling the audio mode to be a TV speaker mode, a second icon for controlling an audio mode to be a Bluetooth speaker mode, and a third icon for performing a surround function. For example, the first icon may be "Internal TV Speaker", the second icon may be "Bluetooth Speaker", and the third icon may be "Internal TV speaker+Bluetooth Speaker". However, this is only an example for convenience of description and is not limited thereto.

Figure 9:
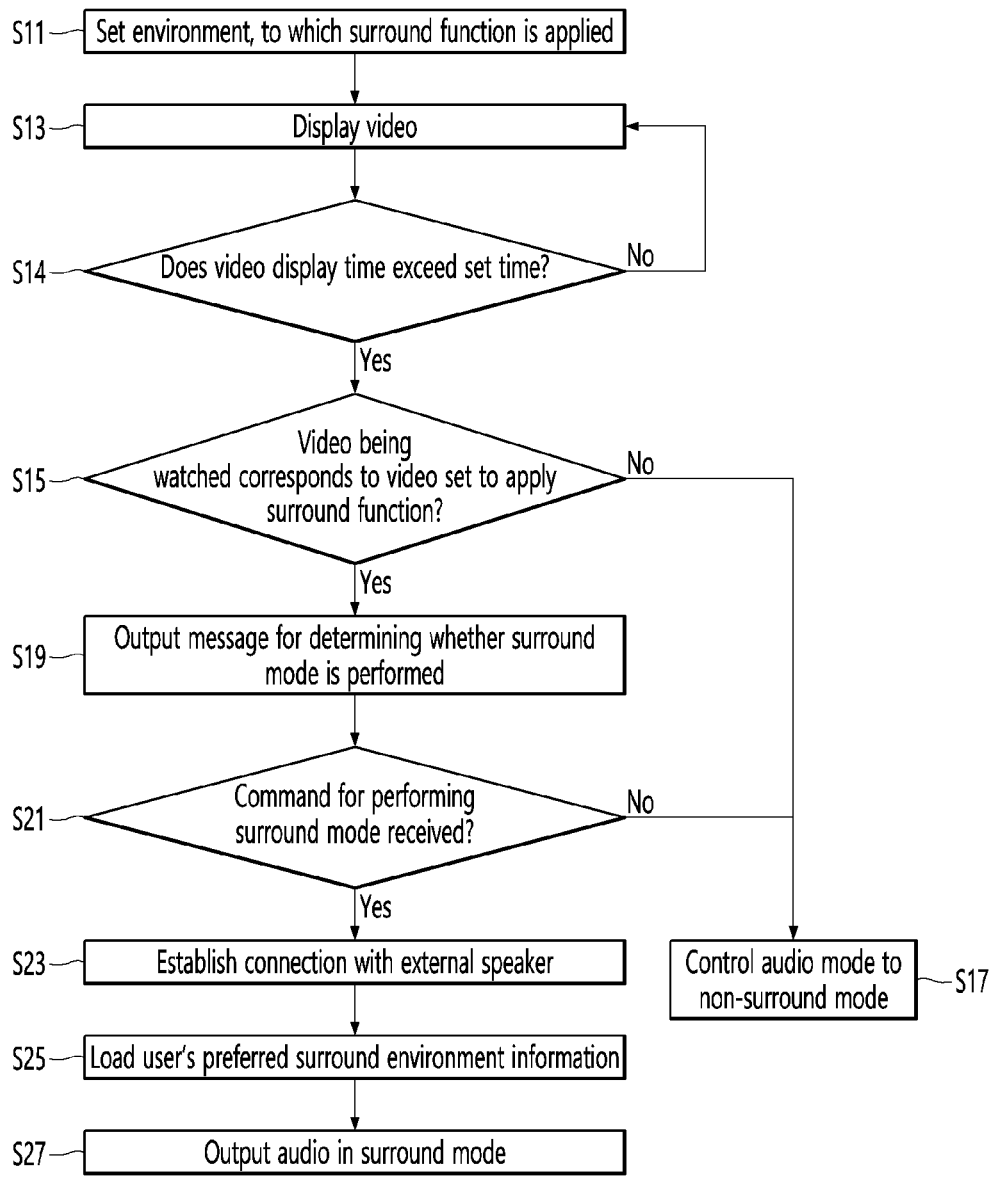
FIG. 9 is a flowchart illustrating a method of operating a display device according to an embodiment of the present disclosure.

The controller 170 may perform control such that only the audio output unit 185 outputs sound when a command for selecting the icon for setting the audio mode to the TV speaker mode is received, perform control such that only the external speaker 300 outputs sound when a command for selecting the icon for setting the audio mode to the Bluetooth speaker mode is received, and control the audio mode to be selectively the surround mode according to the video when a command for selecting an icon for performing the surround function is received, a detailed description of which will be described below with reference to FIG. 9.

In addition, as described with reference to FIG. 8, the audio setting screen may further include a Bluetooth setting icon for setting information on the external speaker 300, a detailed description of which will be omitted.

The audio setting screens shown in FIGS. 7 and 8 are only examples, and the controller 170 may display the audio setting screen using various methods.

The controller 170 may control the audio signal to be any one of a surround mode, a TV speaker mode, a Bluetooth speaker mode or a speaker extension mode according to the video, in a state in which the surround function is set to be performed.

FIG. 9 is a flowchart illustrating a method of operating a display device according to an embodiment of the present disclosure.

The controller 170 may set an environment to which the surround function is applied (S11).

When the surround function is set to be performed, the controller 170 does not control the audio mode to be always the surround mode but may control the audio mode to be selectively the surround mode according to the video. That is, when the surround function is set to be performed, the controller 170 may control the audio mode to be the surround mode or the non-surround mode according to the video.

The controller 170 may set the environment, to which the surround function is applied, in order to distinguish between a video to be controlled in the surround mode and a video to be controlled in the non-surround mode. The user may select the environment, to which the surround function is applied, such that sound is output in the surround mode in a specific video and sound is output in the non-surround mode in another video.

Figure 10:
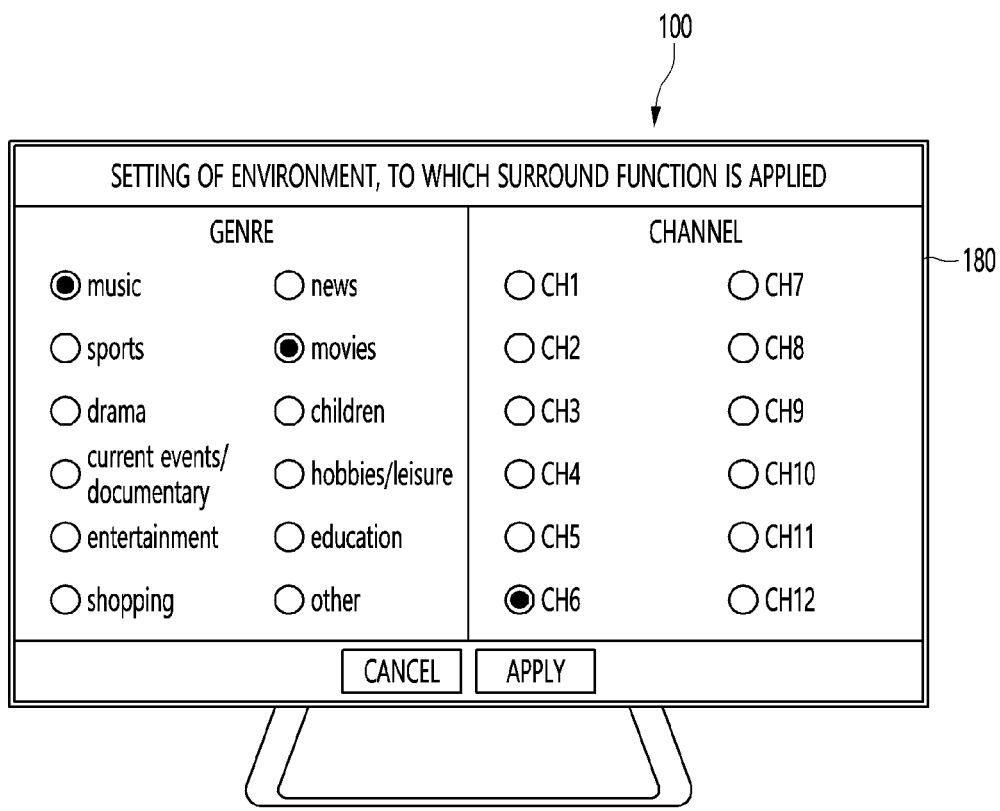
FIG. 10 is a view showing a surround function application environment setting screen according to an embodiment of the present disclosure.

FIG. 10 is a view showing a surround function application environment setting screen according to an embodiment of the present disclosure.

The controller 170 may display a surround function application environment setting screen. The surround function application environment setting screen may be a screen for selecting the genre of a video, to which a surround function will be applied, and the number of a channel, to which the surround function will be applied.

For example, the surround function application environment setting screen may include video genres such as "music", "sports", "drama", "current events/documentary", "entertainment", "shopping", "news", "movies", "children", "hobbies/leisure", "education", "other" as shown in FIG. 10, and include "CH1", "CH2", "CH3", "CH4", "CH5", "CH6", "CH7", "CH8", "CH9", "CH10", "CH11" and "CH12". But, this is only an example and is not limited thereto.

The controller 170 may receive a genre setting command for setting at least one genre as an object, to which the surround function is applied, on the surround function application environment setting screen. In addition, the controller 170 may receive a channel setting command for setting at least one channel number as an object, to which the surround function is applied, on the surround function application environment setting screen.

Meanwhile, although both the video genre and the channel number are shown in FIG. 10, the surround function application environment setting screen may display only the video genre or the channel number.

The controller 170 may set the video genre or the channel number selected through at least one of a genre setting command or a channel setting command, as a video, to which the surround function is applied.

In addition, in some embodiment, the controller 170 may automatically set the video genre and the channel number, to which the surround function is applied, by analyzing a pattern for selecting the surround mode when the user watches the video.

FIG. 9 will be described again.

The controller 170 may preset the type of the video to be controlled in the surround mode through the surround function application environment setting screen described with reference to FIG. 10. If the type of the video to be controlled in the surround mode is not preset, the controller 170 may control the audio mode to be the surround mode regardless of the type of the video when the surround function is performed.

The controller 170 may display a video (S13).

The video may be a broadcast video received through the broadcast reception unit 130, but is not limited thereto. That is, the video may include not only a broadcast video received through the broadcast reception unit 130 but also all videos received through the external device interface unit 135, the wireless communication unit 173 or the like.

The controller 170 may determine whether a video display time exceeds a set time (S14).

When the video displayed by the display unit 180 is changed due to channel change, the controller 170 may count the display time of the changed video.

When the counted display time of the video does not exceed the set time, the controller 170 may continue to display the video. This is because it may be unnecessary to switch the audio mode to the sound mode when the user simply changes the channel.

For example, the set time may be 1 minute, but this is only an example.

On the other hand, when the counted display time of the video exceeds the set time, the controller 170 may determine whether the video being watched corresponds to a video set to apply the surround function (S15).

The controller 170 may determine whether the video being viewed by the user is a video set to apply the surround function, based on the video genre or the channel number preset to apply the surround function.

First, a method of, by the controller 170, determining whether the video being viewed by the user corresponds to the video set to apply the surround function based on the genre of the video will be described.

The controller 170 may acquire the genre of the video which is being displayed by the display unit 180. Specifically, the controller 170 may extract information on the video currently being displayed by the display unit 180 from an electronic program guide (EPG). For example, the information on the video may include a program name, cast, genre, a broadcast time and the like. The controller 170 may acquire the genre of the current broadcast video from the information on the video extracted from the EPG.

The controller 170 may determine whether the acquired genre of the video corresponds to a genre set to apply the surround function. For example, the controller 170 may set a video genre such as "music" and "movie" as an environment, to which the surround function is applied, on the surround function application environment setting screen shown in FIG. 10. In this case, the controller 170 may control the audio mode to be the surround mode when the genre of the video being displayed by the display unit 180 corresponds to a genre set to apply the surround function, such as "music" and "movie", and control the audio mode to be the non-surround mode when the genre of the video being displayed by the display unit 180 does not correspond to "music" and "movie".

Next, a method of, by the controller 170, determining whether the video being viewed by the user corresponds to a video set to apply the surround function based on the channel number will be described.

The controller 170 may acquire the channel number of the video which being displayed by the display unit 180. Specifically, the controller 170 may acquire the channel number of the video which is currently being displayed by the display unit 180 based on a channel change command received through the user input interface unit 150.

The controller 170 may determine whether the channel number corresponds to a channel number set to apply the surround function. For example, the controller 170 may set a channel number "CH6" as an environment, to which the surround function is applied, on the surround function application environment setting screen shown in FIG. 10. In this case, the controller 170 may control the audio mode to be the surround mode when the channel number of the video which is being displayed by the display unit 180 corresponds to a channel number set to apply the surround function, such as "CH6", and control the audio mode to be the non-surround mode when the channel number of the video which is being displayed by the display unit does not correspond to "CH6".

As described above, the controller 170 may determine whether the video being displayed by the display unit 180 corresponds to a video set to apply the surround function.

When the video being displayed by the display unit 180 does not correspond to the video set to apply the surround function, the controller 170 may control the audio mode to be the non-surround mode (S17).

Meanwhile, when the video being displayed by the display unit 180 corresponds to the video set to apply the surround function, the controller 170 may control the audio mode to be the surround mode.

Hereinafter, an embodiment of a method of controlling the audio mode to be the surround mode when the video corresponds to the video set to apply the surround function will be described.

Specifically, when the video corresponds to the video set to apply the surround function, the controller 170 may output a message for determining whether the surround mode is performed (S19).

The controller 170 may determine whether a command for performing the surround mode is received after outputting the message for determining whether the surround mode is performed (S21).

When the command for performing the surround mode is not received, the controller 170 may control the audio mode to be the non-surround mode (S17).

When the command for performing the surround mode is received, the controller 170 may establish connection with the external speaker (S23).

When the command for performing the surround mode is received, the controller 170 may control the audio mode to be the non-surround mode. To this end, the controller 170 may first determine whether connection with the external speaker is established. When the audio mode is switched from the non-surround mode to the surround mode, the controller 170 may determine whether connection with the external speaker 300 is established.

When connection with the external speaker 300 is not established, the controller 170 may control the wireless communication unit 173 for establishing connection with the external speaker. The controller 170 may transmit a connection request signal to the external speaker. When connection with the external speaker fails, the controller 170 may output a message (not shown) for retrying connection.

Meanwhile, when connection with the external speaker is already established, the controller 170 may not establish additional connection with the external speaker.

When connection with the external speaker is established, the controller 170 may load user's preferred surround environment information (S25).

The storage unit 140 may store user's preferred surround environment information.

The user's preferred surround environment information may be surround environment information stored in the storage unit 140 in order to minimize repeated settings of the same surround environment when the user reuses the surround mode, as an environment used when control is previously performed in the surround mode.

The surround environment information may include the wireless connection address (e.g., Bluetooth mac address) of the external speaker 300, the volume of the external speaker 300, the volume of the display device 100, a sound mode (e.g., standard, cinema, football, clear voice, music, games, etc.), the name of the external speaker (including a speaker name specified by the user).

When a plurality of surround environment information is stored in the storage unit 140, the controller 170 may control the display unit 180 to display a list indicating the plurality of surround environment information. When a command for selecting any one surround environment information from the list is received, the controller 170 may load the selected surround environment information.

After the surround environment information stored in the storage unit 140 is loaded, the controller 170 may control the audio output unit 185 and the external speaker 300 to output sound according to the loaded surround environment information.

After loading the surround environment, the controller 170 may output audio in the surround mode (S27).

Next, an example of method of controlling an audio mode to be a surround mode when a video corresponds to a video set to apply a surround function by the display device 100 according to the embodiment of the present disclosure will be described with reference to FIGS. 11 to 13.

Figure 11:
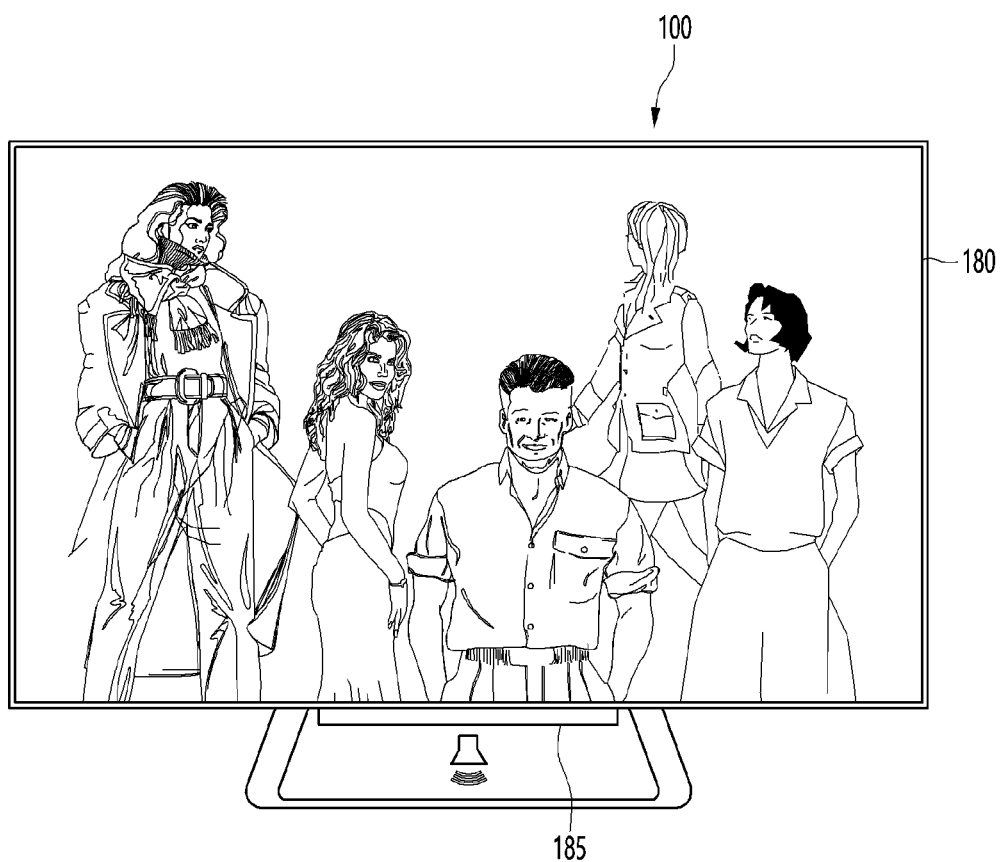
FIG. 11 is a view showing an example of a method of displaying a video by a display device according to an embodiment of the present disclosure.
Figure 12:
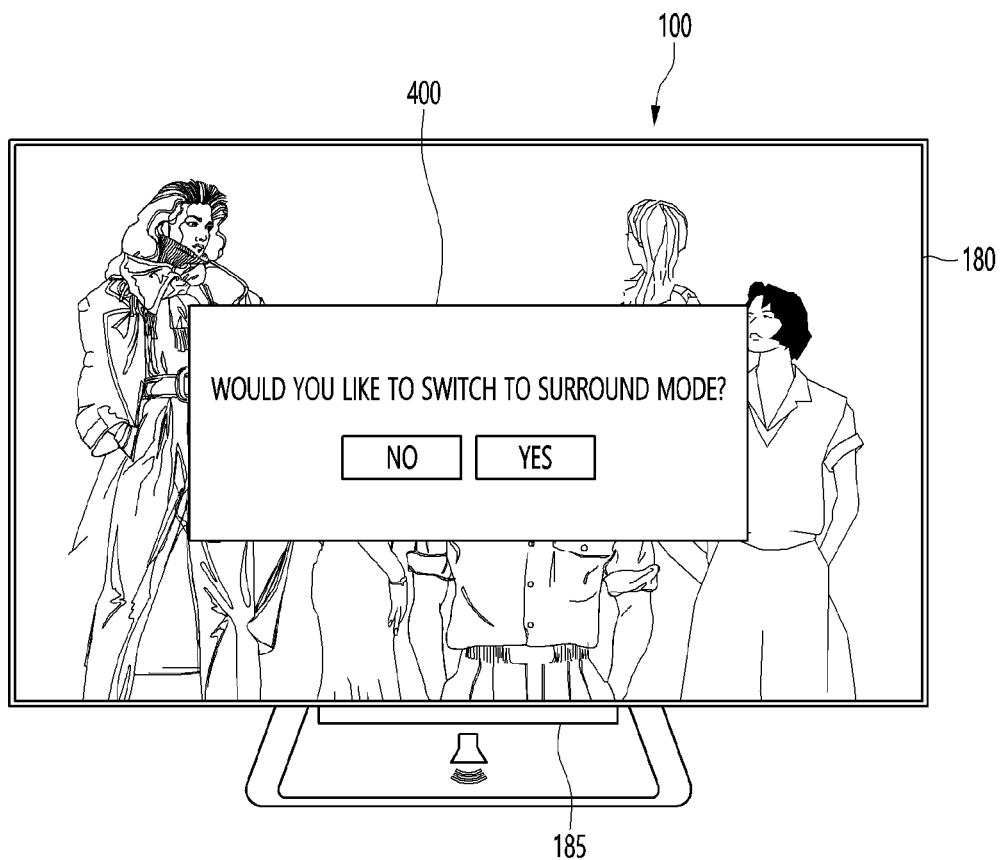
FIG. 12 is a view showing an example of a method of outputting a message for determining whether to apply the surround function by a display device according to an embodiment of the present disclosure.
Figure 13:
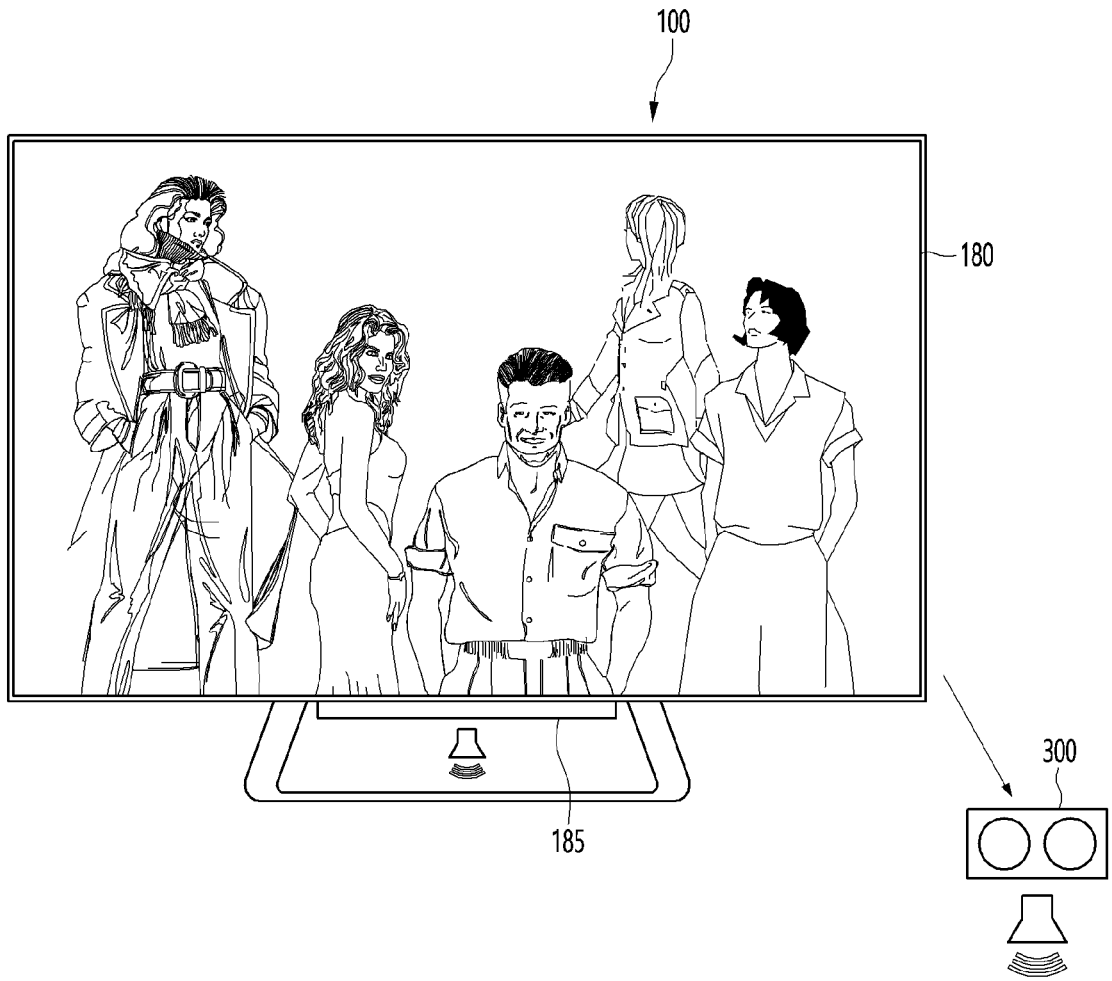
FIG. 13 is a view showing a method of outputting audio in a surround mode by a display device according to an embodiment of the present disclosure.

FIG. 11 is a view showing an example of a method of displaying a video by a display device according to an embodiment of the present disclosure, FIG. 12 is a view showing an example of a method of outputting a message for determining whether to apply the surround function by a display device according to an embodiment of the present disclosure, and FIG. 13 is a view showing a method of outputting audio in a surround mode by a display device according to an embodiment of the present disclosure.

Referring to FIG. 11, the controller 170 may control the display unit 180 to display a video and control the audio output unit 185 to output sound corresponding to the video.

When the video being displayed by the display unit 180 corresponds to a video set to apply the surround function, the controller 170 may control the display unit 180 to display a message 400 for determining whether the surround mode is performed.

Referring to FIG. 12, the message 400 for determining whether the surround mode is performed may include text indicating the surround function (e.g., "Would you like to switch to the surround mode?"), an icon for switching to the surround mode (e.g., "Yes"), and an icon for not switching to the surround mode (e.g., "No").

When a command for selecting the icon for switching to the surround mode is received, the controller 170 may output 2-channel sound through the audio output unit 185 and the external speaker 300.

Figure 14:
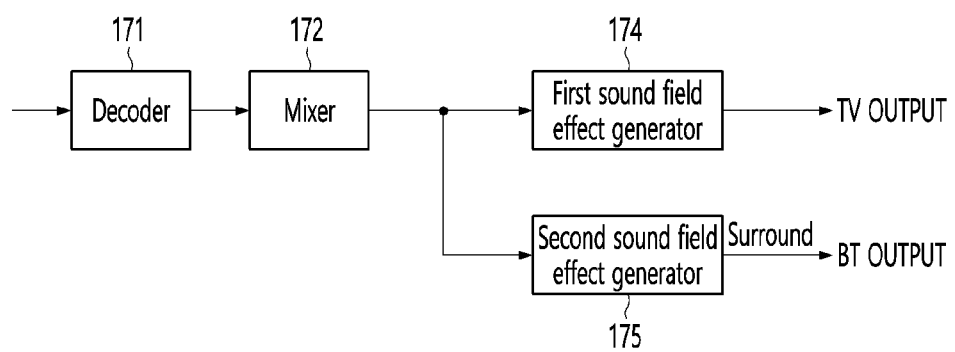
FIG. 14 is an internal block diagram of a controller in order to illustrate the method of outputting sound in a surround mode by a display device according to an embodiment of the present disclosure.

FIG. 14 is an internal block diagram of a controller in order to illustrate the method of outputting sound in a surround mode by a display device according to an embodiment of the present disclosure.

The controller 170 may include a decoder 170a, a mixer 172, a first sound field effect generator 174 and a second sound field effect generator 175. The decoder 171 may decode audio signals corresponding to a video and the mixer 185b may mix the decoded audio signals. The mixed audio signal may be provided to the first sound field effect generator 174 and the second sound field effect generator 175.

The first sound field effect generator 174 may generate and transmit a first sound source to the audio output unit 185 based on the mixed audio signal, and the second sound field effect generator 175 may generate and transmit a second sound source to the external speaker 300 based on the mixed audio signal.

The audio output unit 185 may output the first sound source and the external speaker 300 may output the second sound source, thereby providing the surround effect. For example, the first sound source may be voice of a person in the video and the second sound source may be background sound in the video.

Meanwhile, unlike the flowchart of FIG. 9, when the video corresponds to the video set to apply the surround function, the controller 170 may automatically the audio mode to be the surround mode. That is, in some embodiments, when the video corresponds to the video set to apply the surround function, the controller 170 may control the audio mode to be the surround mode even when separate additional input is not received.

Meanwhile, although only the first sound field effect generator 174 and the second sound field effect generator 175 are shown in FIG. 14, this is only an example for convenience of description and the controller 170 may include two or more sound field effect generators. That is, the controller 170 may be implemented to have two or more channels.

For example, the controller 170 may perform control such that the audio output unit 185 outputs the first sound source, the first external speaker 300a outputs the second sound source, and the second external speaker 300b outputs a third sound source.

Figure 15:
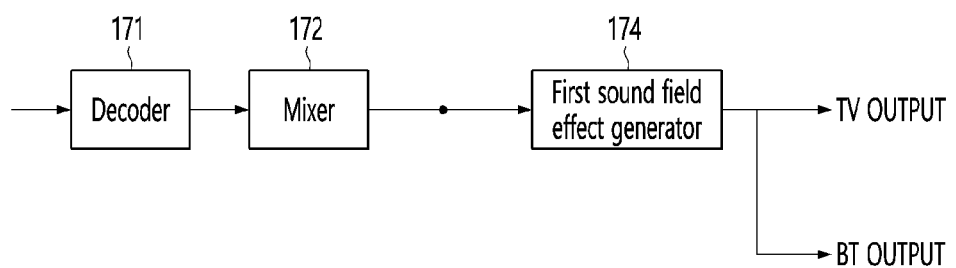
FIG. 15 is an internal block diagram of a controller in order to illustrate a method of outputting sound in a speaker extension mode by a display device according to an embodiment of the present disclosure.

FIG. 15 is an internal block diagram of a controller in order to illustrate a method of outputting sound in a speaker extension mode by a display device according to an embodiment of the present disclosure.

The method of setting the specific genre or the specific channel number of the video in the surround mode has been described above. Meanwhile, the controller 170 may set the video in the speaker extension mode using at least one of the specific genre or the specific channel number.

For example, the controller 170 may set the video genre "news" as an environment, to which the speaker extension mode is applied, and a method of setting the environment, to which the speaker extension mode is applied, may be similar to the method described with reference to FIG. 10.

The controller 170 may control the audio mode to be the speaker extension mode when the genre of the video being displayed by the display unit 1780 is "news". In the speaker extension mode, the controller 170 may establish connection with the external speaker 300 and control the audio output unit 185 and the external speaker 300 to output sound in the surround mode.

More specifically, as described with reference FIG. 14, the controller 170 may include a decoder 170a, a mixer 172, a first sound field effect generator 174 and a second sound field effect generator 175.

The controller 170 may not use the second sound field effect generator 175 in the speaker extension mode. The decoder 171 may decode audio signals corresponding to a video, and the mixer 185b may mix the decoded audio signals. The mixed audio signal may be provided to only the first sound field effect generator 174.

The first sound field effect generator 174 may generate a first sound source based on the mixed audio signal and transmit the first sound source to the audio output unit 185 and the external speaker 300.

The audio output unit 185 and the external speaker 300 may simultaneously output the first sound source. In this case, the user may more clearly listen to sound corresponding to the video.

According to the embodiment of the present disclosure, the controller 170 may control the audio signal to be any one of the surround mode, the TV speaker mode, the Bluetooth speaker mode or the speaker extension mode based on the video genre or channel number to output a sound source suitable for the video, thereby improving user satisfaction.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to illustrate the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

The invention claimed is:
1. A display device comprising:
a display configured to display a video;
an audio output configured to output sound;
a wireless transceiver configured to establish a wireless connection with at least one external speaker; and
a controller configured to generate a first sound source and a second sound source,
wherein the controller is configured to:
set a sound mode of the display device to a surround mode or a non-surround mode according to the displayed video, wherein the surround mode is a mode that each of the audio output and the at least one external speaker outputs different sounds, the non-surround mode comprises a speaker extension mode in which the audio output and the at least one external speaker output a same sound at a same time as the video is being displayed,
transmit the first sound source to the audio output and transmit the second sound source to the at least one external speaker when the sound mode of the display device is set to the surround mode, and
transmit the first sound source to the audio output and the at least one external speaker when the sound mode of the display device is set to the speaker extension mode, wherein the controller is further configured to display a setting screen including a list of a genre of a video and a channel number to which the surround mode is applied, and wherein the controller is further configured to set at least one genre of the video or channel number from the list based on a selection signal from a user or automatically set at least one genre of the video or channel number from the list by analyzing a pattern for selecting the surround mode when the user watches the video.

2. The display device of claim 1, wherein the controller is further configured to:
cause an output of a 2-channel sound through the audio output and the at least one external speaker in the surround mode, and
cause an output of a 1-channel sound through at least one of the audio output or the at least one external speaker in the non-surround mode.

3. The display device of claim 1, wherein the controller is further configured to:
determine whether the displayed video corresponds to a video set to apply a surround function based on a determination that a display time of the displayed video exceeds a set time; and
set the display device to the surround mode based on a determination that the displayed video corresponds to the video set to apply the surround function.

4. The display device of claim 1, wherein the controller is further configured to cause the display to display a message for determining whether to set the display device to the surround mode based on a determination that the displayed video corresponds to a video set to apply a surround function.

5. The display device of claim 4, wherein the controller is further configured to:
set the display device to the surround mode based on a determination that a command for performing the surround mode is received, and
set the display device to the non-surround mode based on a determination that the command for performing the surround mode is not received within a particular time period.

6. The display device of claim 5, wherein the controller is further configured to:
set the display device to the surround mode based on a determination that the displayed video corresponds to a video set to apply a surround function, and
set the display device to the non-surround mode based on a determination that the displayed video does not correspond to the video set to apply the surround function.

7. The display device of claim 1, further comprising a storage configured to store surround environment information used in the surround mode,
wherein the controller is further configured to cause an output sound according to the surround environment information based on establishing the wireless connection with the at least one external speaker.

8. The display device of claim 1, wherein the controller is further configured to set the display device to at least one of the surround mode, the TV speaker mode, the wireless speaker mode, or the speaker extension mode according to the displayed video.

\* \* \* \* \*